(12) United States Patent

Løseth et al.

(10) Patent No.: US 10,416,334 B2
(45) Date of Patent: Sep. 17, 2019

(54) CSEM SURVEY METHOD

(75) Inventors: Lars Ole Løseth, Trondheim (NO);
Lasse Amundsen, Trondheim (NO);
Arne Johannes Kaaijk Jenssen,
Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 1220 days.

(21) Appl. No.: 13/145,276

(22) PCT Filed: Jan. 20, 2010

(86) PCT No.: PCT/EP2010/050653
§ 371 (c)(1),
(2), (4) Date: Oct. 7, 2011

(87) PCT Pub. No.: WO2010/084138
PCT Pub. Date: Jul. 29, 2010

(65) Prior Publication Data
US 2012/0123683 A1    May 17, 2012

(30) Foreign Application Priority Data

Jan. 20, 2009 (GB) .................................. 0900843.4
Feb. 10, 2009 (GB) .................................. 0902143.7

(51) Int. Cl.
*G01V 3/08* (2006.01)
*G01V 3/12* (2006.01)

(52) U.S. Cl.
CPC ............... *G01V 3/12* (2013.01); *G01V 3/083* (2013.01)

(58) Field of Classification Search
CPC ........................................................ G01V 3/12

USPC ............................................................ 702/6
See application file for complete search history.

(56) References Cited

U.S. PATENT DOCUMENTS

| | | | |
|---|---|---|---|
| 4,719,426 A | 1/1988 | Weiss | |
| 2006/0038570 A1* | 2/2006 | Constable | 324/334 |
| 2006/0186889 A1* | 8/2006 | Andreis | 324/345 |
| 2007/0288211 A1* | 12/2007 | MacGregor et al. | 703/5 |
| 2008/0169817 A1 | 7/2008 | Morrison et al. | |

(Continued)

FOREIGN PATENT DOCUMENTS

| | | |
|---|---|---|
| GB | 243370 | 8/1926 |
| GB | 2 423 370 A | 8/2006 |

(Continued)

OTHER PUBLICATIONS

Li et al., "2D Marine Controlled-Source Electromagnetic Modeling: Part 2—The Effect of Bathymetry", Geophysics., vol. 72, No. 2, pp. WA63-WA71, Mar.-Apr. 2007.

*Primary Examiner* — Manuel L Barbee
*Assistant Examiner* — Raymond L Nimox
(74) *Attorney, Agent, or Firm* — Birch, Stewart, Kolasch & Birch, LLP

(57) ABSTRACT

There is disclosed a method of performing a controlled source electromagnetic survey, which includes in one embodiment deploying a receiver and an electric dipole source. The source defines a dipole axis. An electromagnetic field is transmitted from the electric dipole source. First and second horizontal components of an electromagnetic field response are detected using the receiver. A vertical component of the electromagnetic field response is then estimated using the detected first and second horizontal components of the electromagnetic field response.

24 Claims, 11 Drawing Sheets

--- a) Providing first and second horizontal components of an electromagnetic field response detected by at least one receiver deployed in a CSEM survey in which an electromagnetic field is transmitted by an electric dipole source b) estimating a vertical component of the electromagnetic field response by combining the detected first and second horizontal components of the electromagnetic field response

(56) References Cited

U.S. PATENT DOCUMENTS

2008/0284441 A1    11/2008   Kowalczyk et al.
2009/0096457 A1*   4/2009   Srnka et al. .................. 324/334
2009/0140741 A1*   6/2009   Tenghamn ............. G01V 3/083
                                                                                                                         324/347

FOREIGN PATENT DOCUMENTS

| GB | 2 438 430 A | 11/2007 |
| GB | 2 458 280 A | 9/2009 |
| WO | WO 2007/136451 A2 | 11/2007 |
| WO | WO 2008/122554 A2 | 10/2008 |

* cited by examiner a) Providing first and second horizontal components of an electromagnetic field response detected by at least one receiver deployed in a CSEM survey in which an electromagnetic field is transmitted by an electric dipole source b) estimating a vertical component of the electromagnetic field response by combining the detected first and second horizontal components of the electromagnetic field response

Fig. 13A a. Deploying at least one receiver and an electric dipole source b. Transmitting an electromagnetic field from the electric dipole source c. Detecting a first horizontal component and a second horizontal component of an electromagnetic field response to the transmitted electric field using the at least one receiver

Fig. 13B

CSEM SURVEY METHOD

The present invention relates in particular to a method of performing a controlled source electromagnetic (CSEM) survey and related apparatus and methods.

BACKGROUND

Controlled source electromagnetic surveys have been carried out using horizontal or vertical electric dipole sources for transmitting an EM field, with receivers positioned a distance away from the source to measure the EM field components. The marine Controlled Source Electromagnetic (CSEM) method comprises a horizontal electric dipole (HED) source and receivers that measure the EM field components on the seafloor. In shallow water the horizontal field measurements are affected by magnetotelluric (MT)-noise and the so-called airwave component. In order to avoid MT signals and the airwave component in the data, one can in principle use the measured vertical electric and magnetic field, but inaccurate and unstable directionality of the vertical receiver antennas can lead to quite bad measurements for these components.

SUMMARY

According to a first aspect of the invention, there is provided a method of performing a controlled source electromagnetic survey, the method comprising the steps of:
a. deploying at least one receiver and an electric dipole source;
b. transmitting an electromagnetic field from the electric dipole source;
c. detecting a first horizontal component and a second horizontal component of an electromagnetic field response to the transmitted electric field using the at least one receiver; and
d. estimating a vertical component of the electromagnetic field response using the detected first and second horizontal components of the electromagnetic field response.

Step d may comprise using a weighting factor and the detected horizontal field components to estimate the vertical component.

The method may include determining the weighting factor in dependence on at least one property of the medium through which the transmitted electromagnetic field propagates. The at least one property of the medium may include seawater conductivity. The method may include measuring the seawater conductivity.

Step d may comprise estimating a weighted difference or sum based on the detected first and second horizontal field components. Step d may include approximating a horizontal derivative of the electromagnetic field response.

The method may include the steps of: deploying at least one receiver in a first geographical location and at least one receiver in a second geographical location; detecting two horizontal components of the electromagnetic field response using the at least one receiver in the first geographical location to form thereby a first set of horizontal components for the first geographical location; detecting two horizontal components of the electromagnetic field response using the at least one receiver in the second geographical location to form thereby a second set of field components for the second location; and estimating the at least one vertical field component by forming a weighted sum or difference using the first and second sets of detected first and second horizontal field components from the first and second geographical locations.

The two detected horizontal components in each of the first and second sets may be orthogonal components.

The method include the steps of: processing the detected first set of horizontal components of the field to form at least one first processed horizontal component of the field response for the first geographical location in a direction defined along a pre-determined axis; processing the detected second set of horizontal components of the field to form at least one second processed horizontal field component for the second geographical location in a direction defined along the same pre-determined axis; and forming the weighted sum or difference by forming a sum or difference between of the at least one first and second processed horizontal field components derived for the first and second geographical locations.

The at least one first processed field horizontal component of the field response may comprise two first processed horizontal components which are orthogonal; and the at least one second processed component of the field response may comprise two second processed horizontal components which may be orthogonal, wherein the first and second processed horizontal components for the first and second geographical locations provide corresponding or the same components of the field response, for example, the $E_x$ component and/or any of the $E_y$, $H_x$ or $H_y$ components of the response at both locations. The corresponding component of the response at different locations may differ in amplitude.

The at least one receiver may be arranged in a receiver station or receiver unit, which may be located in different geographical locations.

The first and second geographical locations and/or receiver stations may be spaced apart by a distance of more than around 100 m. More specifically, the first and second geographical locations may be spaced apart by a distance of between around 200 to 1000 m.

The method may include deploying at least one receiver in at least three different geographical locations wherein the first and second locations are on a line extending at least between first and second locations and the third geographical location is located off said line; detecting at least two horizontal orthogonal components of the electromagnetic field response using the at least one receiver to thereby form a set of orthogonal components at each location; processing the detected set of components for each location to derive at least one processed set of orthogonal horizontal components for each location, such that the processed sets of orthogonal horizontal components comprise corresponding components of the electromagnetic field response for each location; and estimating vertical magnetic and vertical electric components of the electromagnetic field response includes differencing or summing the processed horizontal components from different geographical locations defined along the same axis direction.

The estimated vertical component of the electromagnetic field may be selected from the group consisting of: a vertical electric ($E_z$) component; a vertical magnetic ($H_z$) component; a vertical derivative of the vertical electric field component; and a vertical derivative of the vertical magnetic field component.

The electric dipole source may be a vertical or horizontal electric dipole source.

The step of deploying at least one receiver may include: deploying first and second receivers to form a first receiver pair on a first receiver line extending at least between the first and second receivers, and deploying third and fourth receivers to form a second receiver pair on a second receiver line extending at least between the third and fourth receivers, and arranging the first and second receiver pairs so that the first and second receiver lines intersect. It may include deploying at least the first or second receiver and the third or fourth receiver in a common receiver unit at a first deployment locality.

The method may include the step of arranging the first and second receiver pairs so that the first and second receiver lines are arranged orthogonally.

The method may include the step of detecting a first horizontal component of the electromagnetic field response in a direction defined along the first receiver line and detecting a second horizontal component of the electromagnetic field response in a direction defined along the second receiver line.

The source may be a horizontal dipole source, the source defining a dipole axis, and the method may include the step of arranging the horizontal electric dipole source to form an acute angle between the dipole axis and a line extending between the source and the at least one receiver. The source may be oriented to form an inline configuration and/or a broadside configuration with the at least one receiver.

According to a second aspect of the invention, there is provided apparatus for performing an controlled source electromagnetic survey, comprising:
- an electric dipole source having a dipole axis and arranged to transmit an electromagnetic field;
- at least one receiver adapted to detect a first horizontal component and a second horizontal component of an electromagnetic field response; and
- a processing unit configured or operative to estimate a vertical component of the electromagnetic field response the detected first and second horizontal components of the response.

The second aspect may include further features as described above in relation to the first aspect of the invention, where appropriate.

According to a third aspect of the invention there is provided a method of processing controlled source electromagnetic data, comprising the steps of:
a. providing data comprising first and second horizontal components of an electromagnetic field response detected by at least one receiver deployed in a controlled source electromagnetic survey in which an electromagnetic field is transmitted by an electric dipole source; and
b. processing the data to estimate a vertical component of the electromagnetic field response from the first and second horizontal components of the response.

The third aspect may include further features as described above in relation to the first aspect of the invention, where appropriate.

According to a fourth aspect of the invention, there is provided a computer program for processing controlled source electromagnetic data, the data comprising first and second horizontal components of an electromagnetic field response detected by at least one receiver deployed in a controlled source electromagnetic survey in which an electromagnetic field is transmitted by an electric dipole source, whereby the data are read in and processed to estimate a vertical component of the electromagnetic field response from the first and second horizontal components of the response.

The fourth aspect may include further features as described above in relation to the first aspect of the invention, where appropriate.

According to a fifth aspect of the invention, there is provided a computer loaded with machine-readable instructions for the computer to perform processing controlled source electromagnetic data, the data comprising first and second horizontal components of an electromagnetic field response detected by at least one receiver deployed in a controlled source electromagnetic survey in which an electromagnetic field is transmitted by an electric dipole source, whereby data are read in and processed by the computer according to the instructions to estimate a vertical component of the electromagnetic field response from the first and second horizontal components of the response.

The fifth aspect may include further features as described above in relation to the first aspect of the invention, where appropriate.

DESCRIPTION AND DRAWINGS

There will now be described, by way of example only, at least one embodiment of the invention, with reference to the accompanying drawings, in which.

Figure 3:
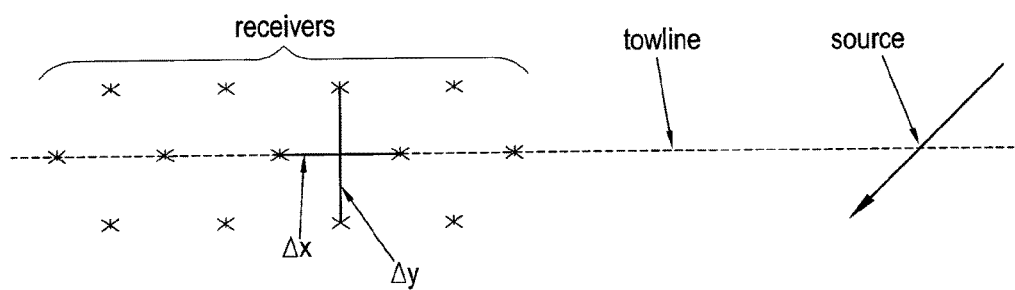

FIG. 3 shows a survey layout for an "ideal" CSEM experiment aimed at estimating vertical field components so as to reduce the amount of correlated noise in the data and to help extract TE- and TM-components. The receiver layout enables calculation of horizontal field differences, and the two-component source enables calculation of both $E_z$ and $H_z$ components potentially indicative of TE and TM mode behaviour.

Figure 4:
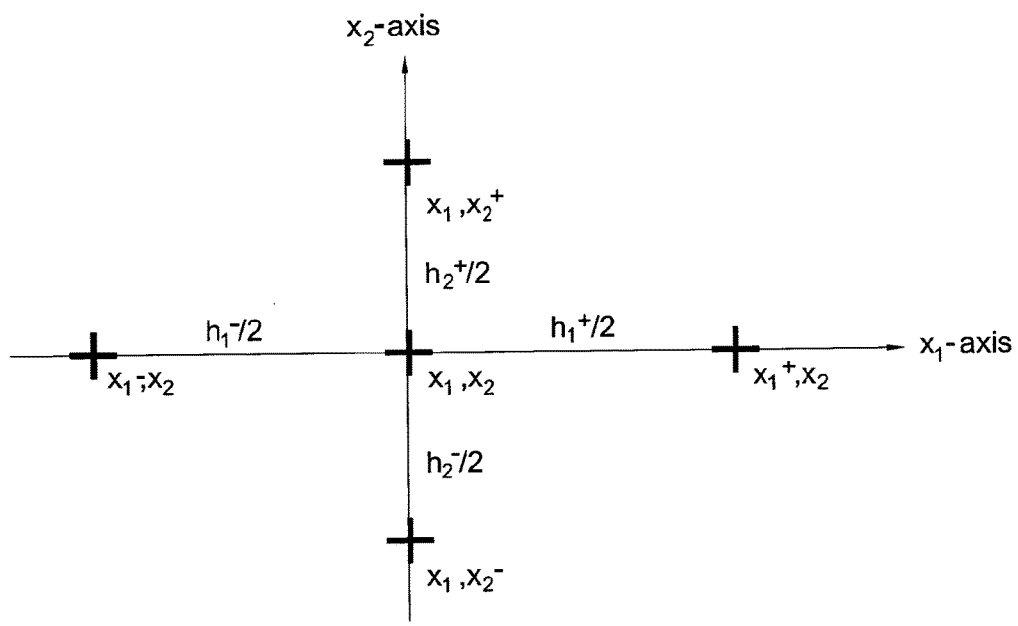

FIG. 4 shows a receiver layout in the CSEM survey which allows the calculation of $E_3$ and $H_3$ at location $(x_1, x_2)$ from measurements of the horizontal field components at locations $(x_1, x_2)$, $(x^{\pm}_1, x_2)$ and $(x_1, x^{\pm}_2)$. Bold crosses aligned with the axes denote receivers with sensors aligned in orthogonal directions.

Figure 5:
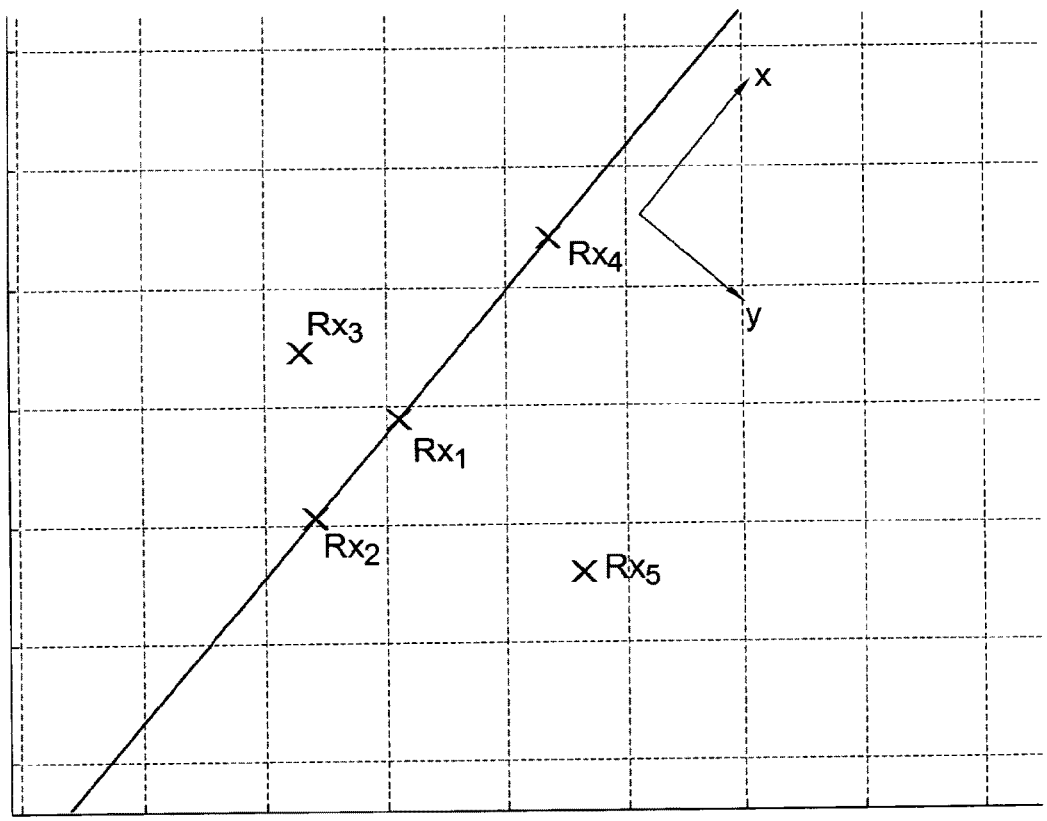

FIG. 5 is a plan view of the survey layout for the field difference calculations where real data were obtained.

Figure 6A:
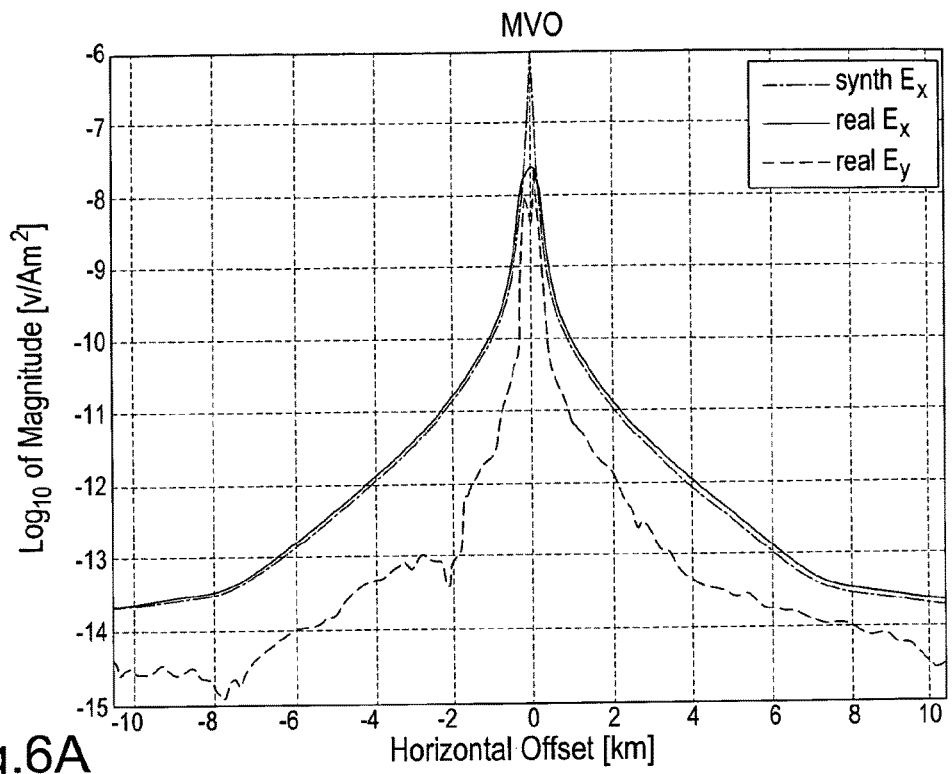
Figure 6B:
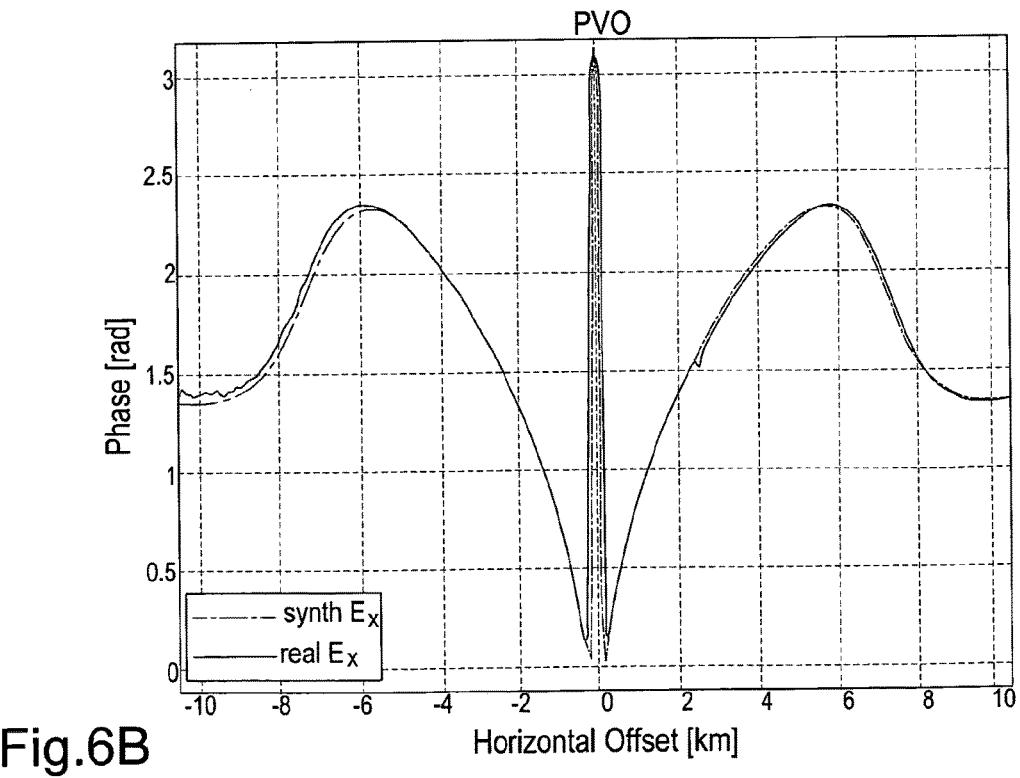

FIG. 6A is a magnitude versus offset (MVO) plot for the total electric field for receiver Rx1 of FIG. 5. The solid line is the MVO for the $E_x$-component, the dashed line is the MVO for the $E_y$-component, and the dash-dot line represents the modelled $E_x$-field for a "best fit" synthetic model. FIG. 6B shows the corresponding phase versus offset (PVO) plots for the field component of FIG. 6A.

Figure 7A:
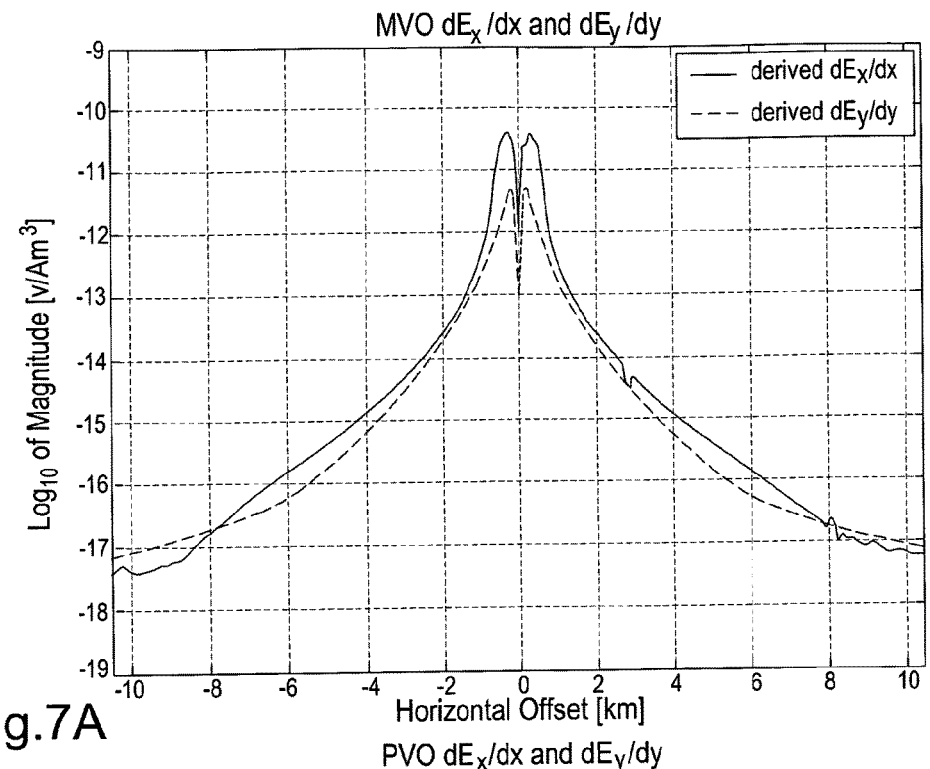
Figure 7B:
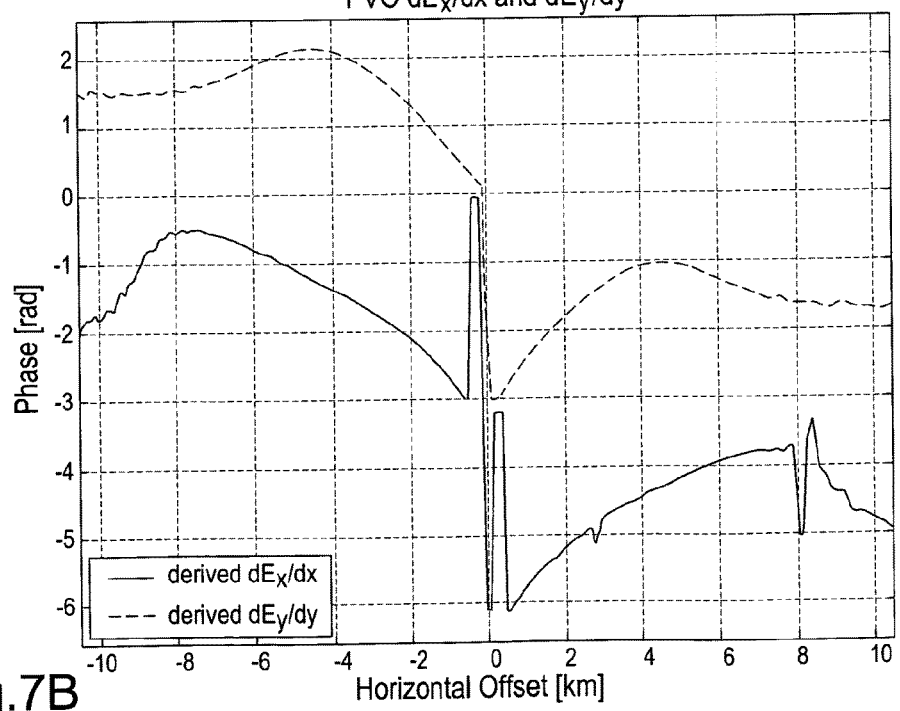

FIGS. 7A and 7B show MVO and PVO curves for the difference $E_x$-field components along the x-direction (solid line) and the difference $E_y$-field components along the y-direction (dashed line) for a receiver separation of 600 m.

Figure 8A:
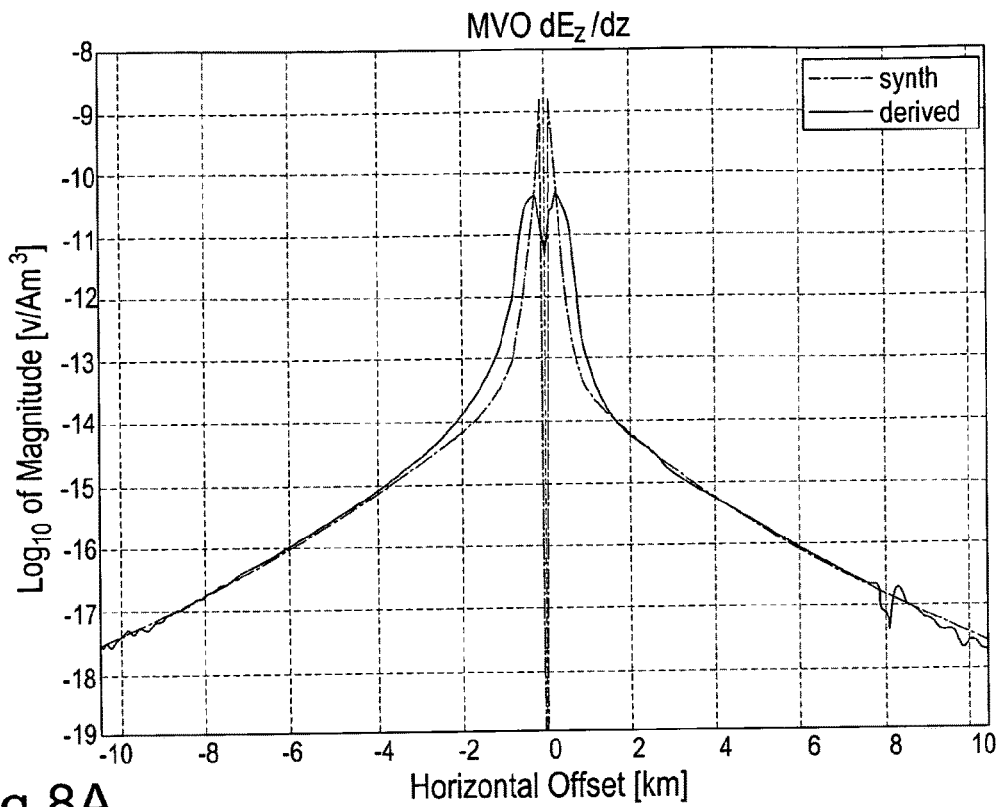
Figure 8B:
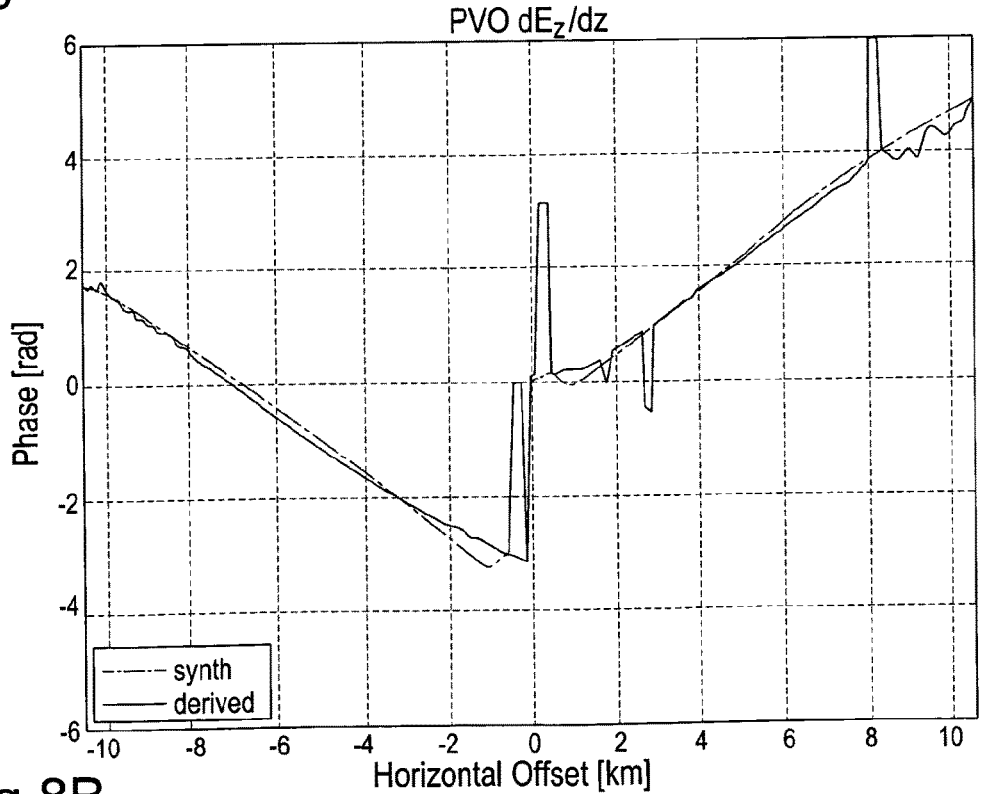

FIG. 8A show MVO curves for the computed $dE_z/dz$ field component for 600 m receiver separation (solid line) and the modelled $dE_z/dz$ field (dashdot line) using the same synthetic model as in FIG. 6. FIG. 8B shows corresponding PVO plots for the field component of FIG. 8A.

Figure 9A:
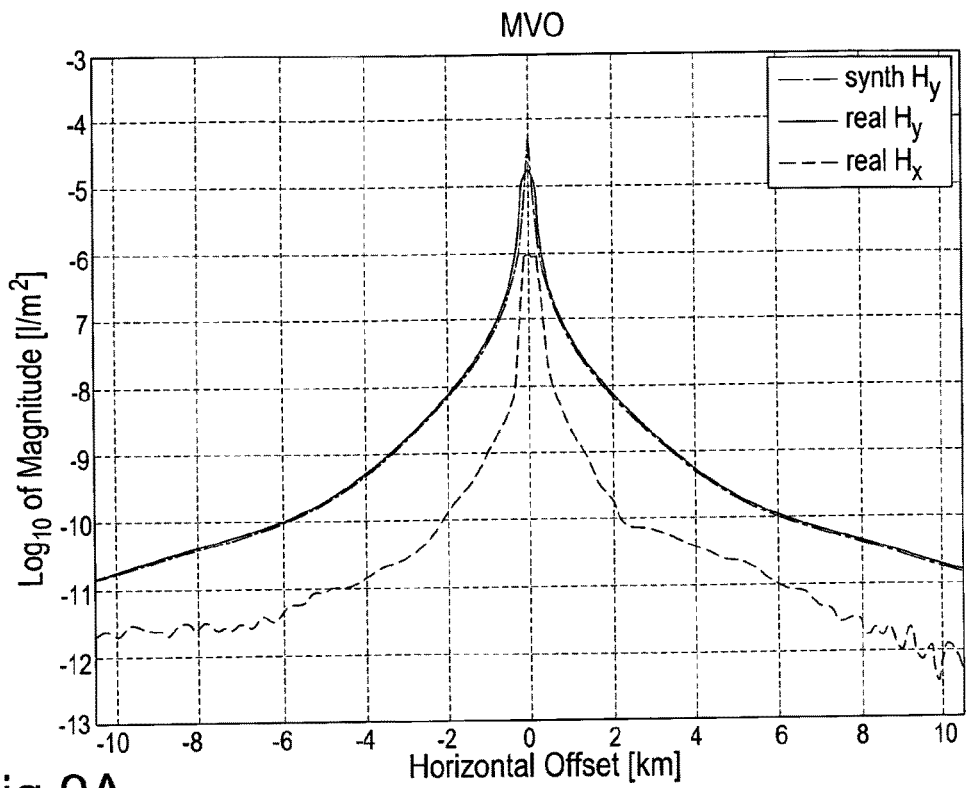
Figure 9B:
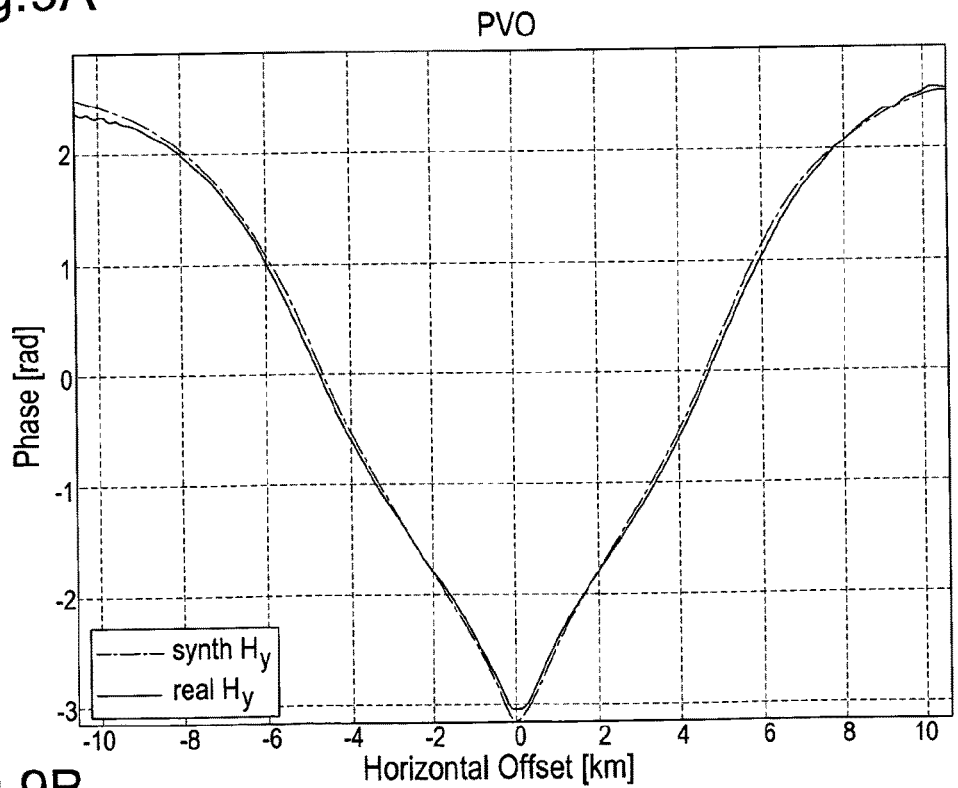

FIG. 9A shows MVO for the total magnetic field for receiver Rx1 in FIG. 5. The solid line is the MVO for the $H_y$-component, the dashed line is the MVO for the $H_x$-component, and the dash-dot line represents the modelled $H_y$ field for the "best fit" synthetic model. FIG. 9B provides the corresponding phase versus offset (PVO) plots.

Figure 10A:
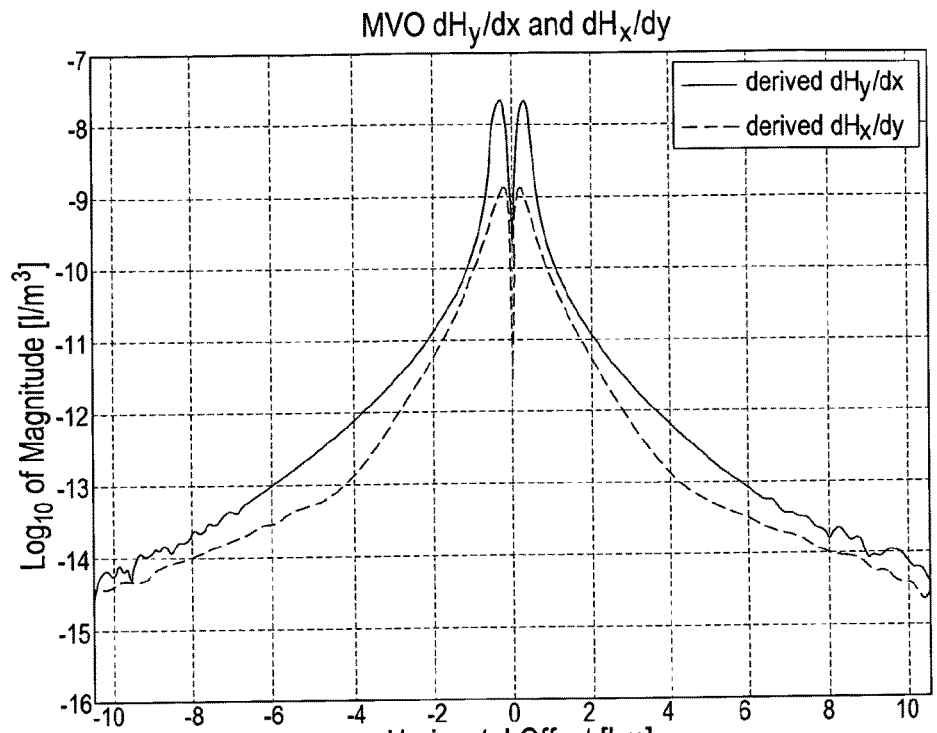
Figure 10B:
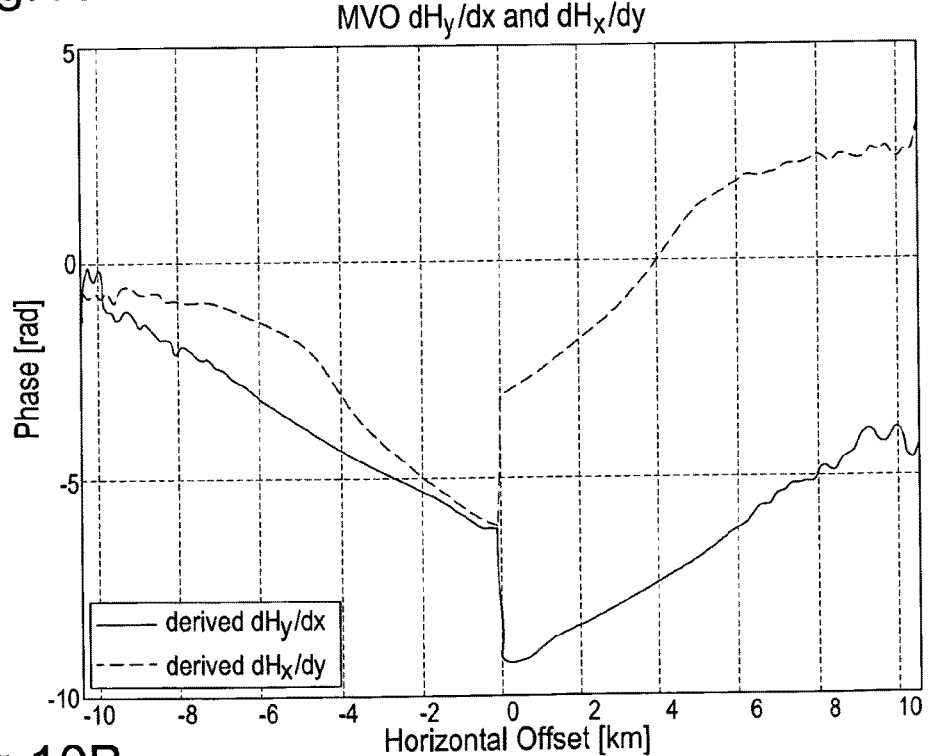

FIGS. 10A and 10B show MVO and PVO, respectively, of the difference $H_y$-field components along the x-direction (solid line) and the difference $H_z$-field components along the y-direction (dashed line) for a receiver separation of 600 m.

Figure 11A:
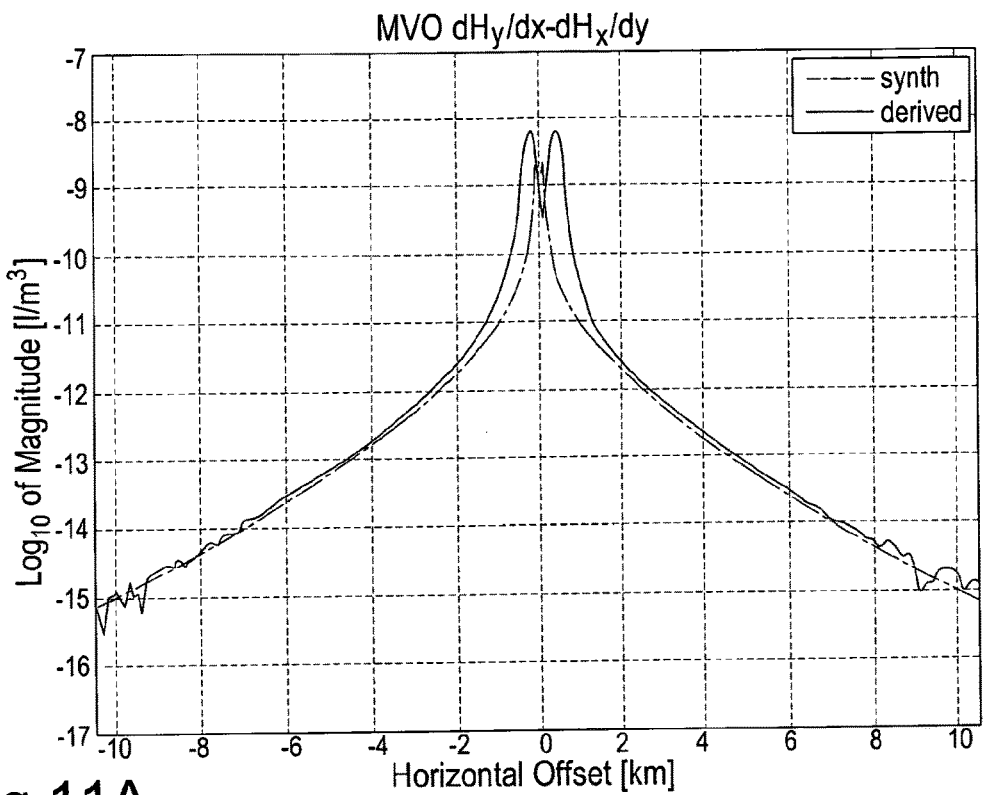
Figure 11B:
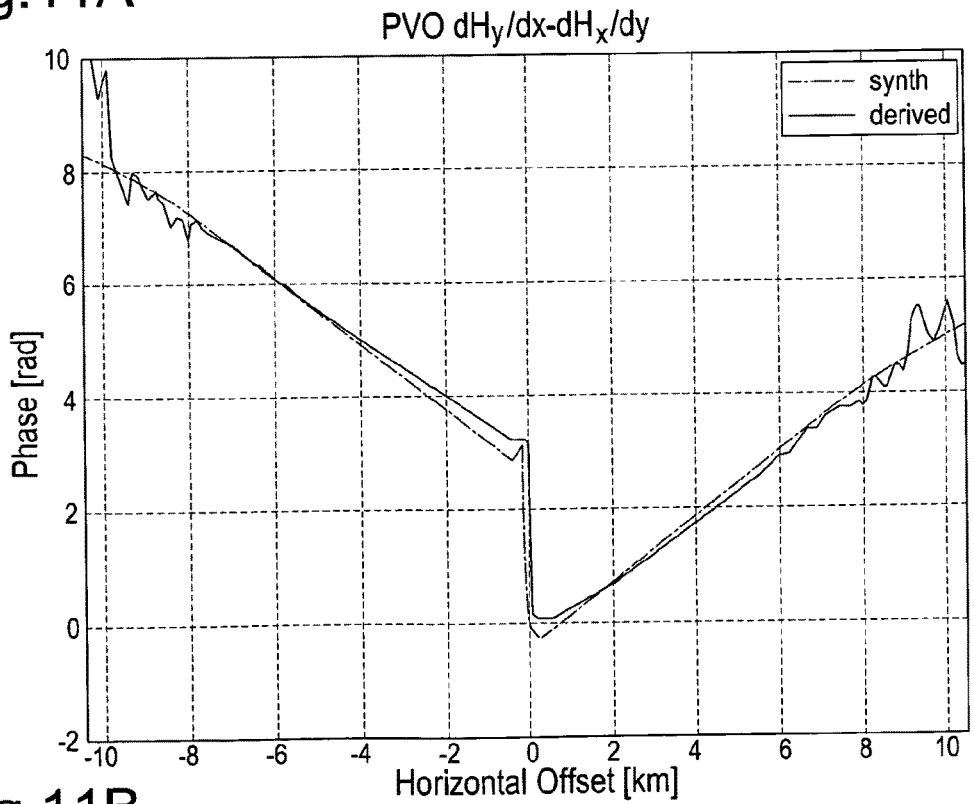

FIG. 11A shows the MVO for the combined H-field differences, i.e., a scaled $E_z$-field (solid line). The corresponding results using synthetic data are given by the dashdot curve. The corresponding PVO plots are presented in FIG. 11B.

Figure 12A:
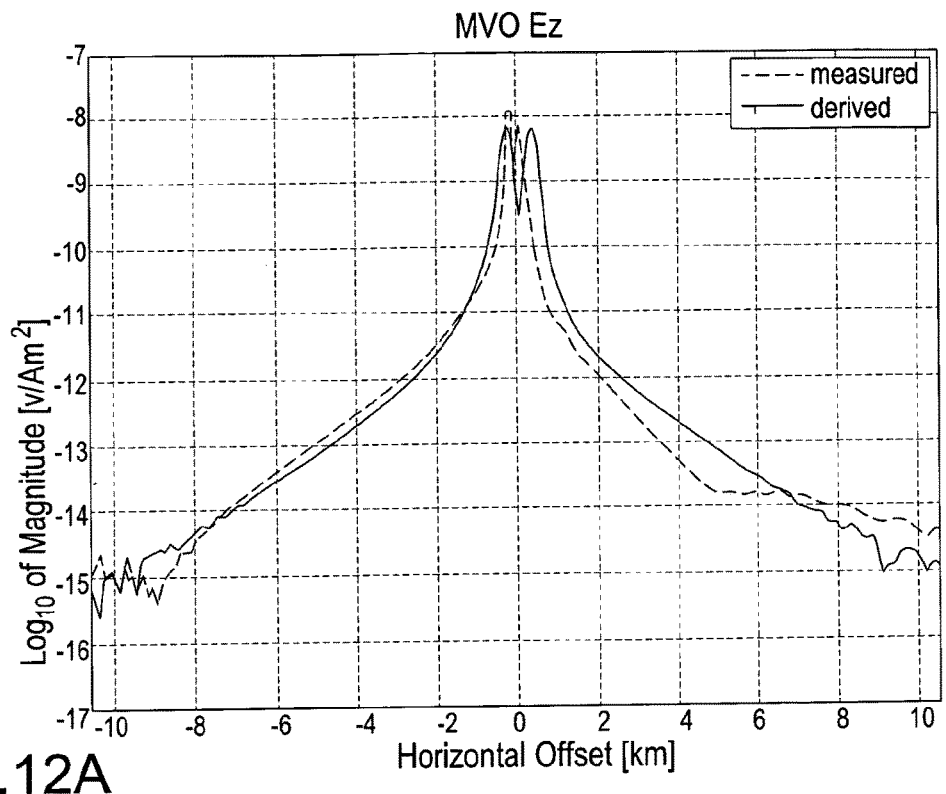
Figure 12B:
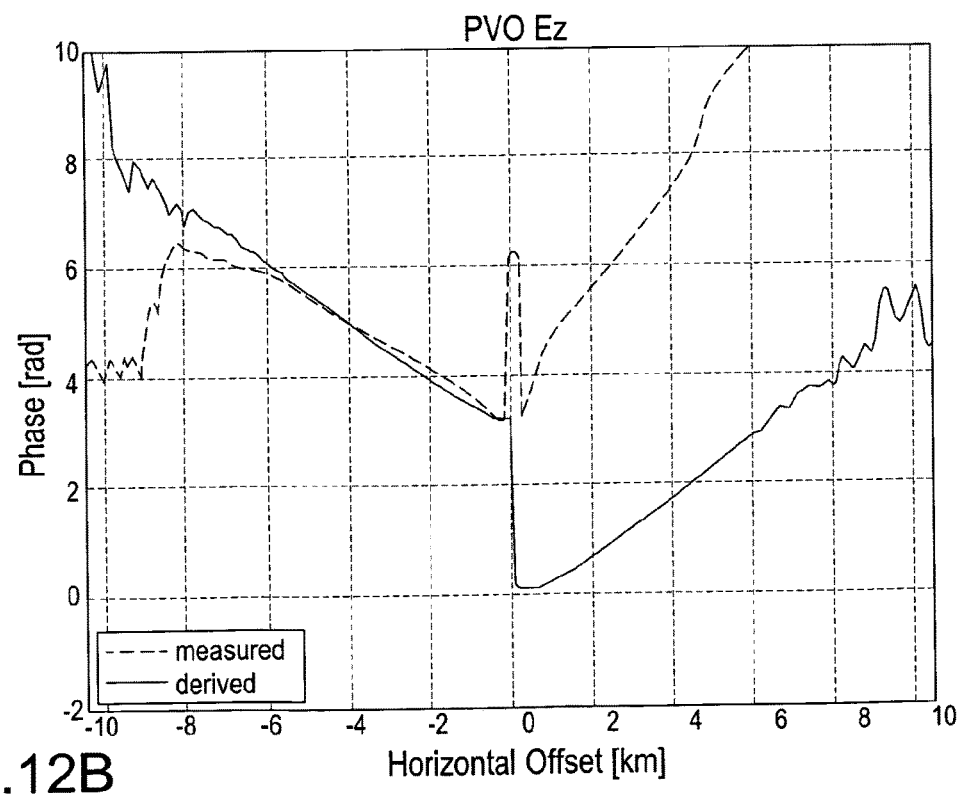

FIGS. 12A and 12B show the MVO and PVO, respectively, of the measured $E_z$-component (dashed line) and the derived $E_z$-component using a scaled version of the calculated H-field differences (solid line).

FIG. 13A is a flowchart showing a method of processing controlled source electromagnetic (CSEM) survey data according to one embodiment of the present application; FIG. 13B is a flowchart showing a method of performing a controlled source electromagnetic (CSEM) survey.

The conventional marine Controlled Source Electromagnetic (CSEM) method comprises a horizontal electric dipole (HED) source and receivers that measure the EM field components on the seafloor. In shallow water the horizontal field measurements are affected by MT-noise and the so-called airwave component. In order to avoid MT signals and the airwave component in the data, one can in principle use the measured vertical electric and magnetic field, but inaccurate and unstable directionality of the vertical antennas can lead to quite bad measurements for these components.

In view of this, a survey method is described where the vertical field components are estimated from the measured horizontal components. Results indicate that the estimates of vertical electric and magnetic fields from measured horizontal components can be of better quality than where measured directly.

In order to form such approximations, differences between measured horizontal components are taken and as a result the amount of correlated "noise", e.g, airwave and MT signals, is reduced in the calculated data.

Below we demonstrate how the vertical electric or magnetic field components are estimated in practice and also how we reduce the amount of correlated noise in measured data, and that the estimated data corresponds well to a modelled vertical electric field and its vertical derivative.

It should be noted that the vertical electric and vertical magnetic fields can be particularly useful for interpretation and modelling purposes, because in many survey settings the vertical electric and magnetic fields respectively can contain dominant TM and TE polarised components which can help to distinguish between different types of buried conductive bodies. This is explained further below.

CSEM Methods

The introduction of the SeaBed logging method, described in Ellingsrud, S. Eidesmo, T., Sinha, M. C., MacGregor, L. M., and Constable, S. C., 2002, *"Remote sensing of hydrocarbon layers by SeaBed Logging (SBL): Results from a cruise offshore Angola: Leading Edge*, 20, 972-982, 2002, has led to an extended use of the CSEM method for hydrocarbon exploration in the last few years. A typical experiment requires a powerful horizontal dipole (HED) source which emits a continuous square-like wave into the seawater. The two major pathways for propagation of the CSEM signal are through the subsurface, and through the air (Løseth, L. O., *Modelling of Controlled Source Electromagnetic Data*, PhD Thesis, NTNU, 2007). In addition there is the direct field through the seawater which is transmitted directly from the electric dipole source to the receiver. However, this signal is strongly damped due to the strong attenuation in the conductive seawater. The subsurface structures in general are more resistive than the seawater, and as a result, the electromagnetic fields propagating into the subsurface before returning to the seabed are less attenuated than the direct field. A hydrocarbon saturated reservoir has relatively high resistivity compared to the shales and water-filled sandstones of the subsurface. Thus, when the electromagnetic field is guided a long distance in hydrocarbon reservoirs, the detected signals can dominate in amplitude over those signals that have propagated in the water-bearing sediments. It is the enhancement in field amplitudes at long source-receiver separations (compared to the depth of the reservoir) that is the basis for detecting hydrocarbon reservoirs.

The signal that diffuses vertically upwards from the source to the sea surface, then propagating through the air at the speed of light with no attenuation, before diffusing back down through the seawater column to the sea bottom is referred to as the "airwave". For "shallow" water depth relative to the target depth and low frequencies, the airwave signal may be dominant so that the signal from the subsurface possibly containing valuable information about the resistive hydrocarbon reservoir is hardly distinguishable. Various schemes have been proposed to separate the airwave from the subsurface signal. The simplest solution is to include the air layer in the inversion and interpretation. Examples of other solutions involve the modelling of the water-layer's airwave effect, and then subtracting it from the field data for the relevant source-receiver geometries (see WO2005/010560, Method for removing airwave effect from offshore frequency domain controlled-source electromagnetic data), or applying electromagnetic field decomposition into up-going and down-going components (Amundsen, L., Løseth, L. O., Mittet, R., Ellingsrud, S., and Ursin, B., *Decomposition of electromagnetic fields into upgoing and downgoing components, Geophysics* 71, G211-G223, 2006), or eliminating the water-layer effect (Nordskag, J., Amundsen, L., Løseth, L. O., and Holvik, E., *Elimination of the water-layer response from multi-component source and receiver marine electromagnetic data, Geophysical Prospecting*, 57 (No 5), 897-918, 2008).

In the measured EM data at large source-receiver offsets, signals resulting from sources other than the HED are present, e.g., magnetotelluric (MT) signals (Constable, S. and Weiss, C. J., *Mapping thin resistors and hydrocarbons with marine EM methods: Insights from 1D modelling, Geophysics* 71, G43-G51, 2006) and uniform sea currents. Common for these signals are that they will be similar when the separation between receivers is not large since they come from the same source and to a good approximation "see" the same subsurface.

The electromagnetic field radiated by an electric or magnetic dipole source can be considered to consist of two different modes: one transverse electric (TE) mode components and one transverse magnetic (TM) mode component (Kong, J. A., *Classical Electrodynamics*, John Wiley & Sons, 3$^{rd}$ Edition, 2000; Chew, W. C. *Waves and Fields in Inhomogeneous Media*, IEEE press, 1995). The relative contribution of each mode component depends on the type of source and its orientation (Nabighian, 1987). The response of both seawater and the subsurface to the source signal is generally very different for the TE- and TM-mode components. The TE-mode components are very little affected by high-resistive hydrocarbon layers. In contrast, the TM-mode components strongly interact with any high-resistive hydrocarbons layers. The contrasting TE and TM-mode behaviour can be used to help interpret EM data. On the other hand, the airwave component is known to be predominantly caused by the TE-mode components of the source, since the TE-mode components are efficiently inductively coupled across the seawater/air interface. In contrast, the TM-mode components are known to couple less well across the seawater/air interface, and therefore do not contribute significantly to the airwave components for the finite offsets recorded in CSEM surveys.

Vertical Fields in CSEM

We refer to the vertical electric field and its vertical derivative as $E_z$ data and the vertical magnetic field and its vertical derivative as $H_z$ data. Correlated noise refers in this case to MT signals, possibly also uniform sea-currents. For the $E_z$ data, correlated noise also refers to the airwave and other TE-polarized signals, whereas for $H_z$ data, TM-mode data can be looked upon as correlated noise.

Vertical field data can be important for resolving whether an increase in electromagnetic field amplitude is related to the presence of hydrocarbons. Local large-scale resistive bodies other than hydrocarbon reservoirs beneath the seabed can significantly affect the electromagnetic fields due to longer skin depths with increasing resistivity. Increasing resistivity structures with depth are a feature of some submarine sedimentary basins and are known to arise due to the progressive expulsion of conductive pore fluids with increasing depth by rising overburden pressure. In such cases both the $E_z$ and $H_z$ responses will be sensitive to the larger scale resistive structures, whilst in hydrocarbon-bearing structures, $E_z$ tends to be more sensitive than $H_z$. Therefore, a combined concurrent analysis of the individual $E_z$ and $H_z$ data components holds the potential to solve the ambiguity of whether an increase in $E_z$ response is related to resistive hydrocarbon-saturated reservoirs or large-scale resistive non-hydrocarbon-filled structures. In other words, an increased $E_z$ amplitude together with an unchanged, small $H_z$ amplitude can be indicative of the likely presence of a subsurface hydrocarbon-saturated reservoir. Increased amplitudes on both the calculated $E_z$ and $H_z$ components, on the other hand, indicate local large-scale high-resistive bodies that are not necessarily hydrocarbon-saturated. It is further noted that for the $H_z$ data to be useful for this particular combined, concurrent analysis the airwave component should be removed from the field recordings. In deep water, the airwave component is strongly attenuated by its two-way propagation in the water-column. In shallow water where the target prospect is relatively deep below the seabed the airwave component tends to dominate the received signal at long source-receiver separations. Then, the airwave component in principle can be attenuated from the Hz component by elimination of the sea surface effect as described in Nordskag, J., Amundsen, L., Løseth, L. O., and Holvik, E., *Elimination of the water-layer response from multi-component source and receiver marine electromagnetic data, Geophysical Prospecting*, 57 (No 5), 897-918, 2008.

TE/TM Polarization Modes

An electromagnetic field in homogeneous, source-free region of space can be described as the sum of a transverse electric (TE) and transverse magnetic (TM) field with respect to an arbitrary, fixed coordinate direction (Morse and Feshbach, *Methods of Theoretical Physics*, McGraw-Hill, 1953; Stamnes, J. J. *Waves in Focal Regions*, Adam Hilger, 1986). Let x=(x,y,z) denote a Cartesian coordinate system, with unit vectors $(e_x, e_y, e_z)$ along the axes, and with the z-axis pointing downwards. Furthermore, let $E=(E_x,E_y,E_z)^T$ and $H=(H_x,H_y,H_z)^T$ denote the electric and magnetic field vectors, respectively. The electric (E) and magnetic (H) fields are the superposition of TE and TM fields according to $$E=E^{TE}+E^{TM}, H=H^{TE}+H^{TM}. \quad (1)$$

The definitions of TE and TM components related to the fixed axis $e_z$ are: for TE modes, $E_z=0$, $H_z=H_z^{TE}\neq 0$; for TM modes, $H_z=0$, $E_z=E_z^{TM}\neq 0$.

The motivation for decomposing an EM field into two sets of orthogonal components for the TE- and TM-polarization modes is that these polarization components behave differently when reflected from or transmitted through an interface. For a plane-wave component of the EM field that is impinging on an interface, a "plane of incidence" can be defined from the wave number vector k of the field and the interface normal, i.e. $e_z$. Both the electric and magnetic fields can be split into components where one is normal to the plane of incidence and the other is in the plane of incidence. The TE component is then defined as the set of components where the electric field is transverse to the plane of incidence. The TM components are defined as the set of components where the magnetic field is transverse to the plane of incidence (Stratton, J. A., *Electromagnetic Theory*, McGraw Hill, 1941).

In general, the definitions of TE and TM modes in terms of a fixed axis and in terms of reflection and transmission from a planar interface are different. However, in isotropic (and vertically transverse isotropic) plane-layered media with the stratification in the $e_z$-direction, these definitions are equivalent, and hence, the field equations can be written as a sum of the incident and scattered TE- and TM-polarized modes.

In structures that deviate from stratification, the definition of TE- and TM-polarization components in terms of reflection and transmission is ambiguous. At a receiver location in a homogeneous region of space the field can still be separated into two sets of components where one set is defined from $E_z=0$ and the other from $H_z=0$. When this criterion is used as the definition of TE and TM modes, both modes will contain responses that are reflected and transmitted as both TE- and TM-polarization components in terms of the TE/TM definitions for reflection and transmission. For many scenarios in geophysical applications, a good approximation to the geological model is one of stratified layers. Then the definitions for TE and TM polarization in terms of vertical field components give modes that may correspond well to the scattered TE and TM-modes, respectively. In CSEM surveys therefore, vertical field data can be indicative of TE and TM mode behaviour.

Maxwell's Equations

By writing out Maxwell's equations (Jackson, J. D., *Classical Electrodynamics*, John Wiley and Sons, 3$^{rd}$ edition, 1998; Nabighian, M. N., *Electromagnetic Methods in Applied Geophysics*, Vol. 1: *Theory*, Vol 2: *Applications, Series: Investigations in Applied Geophysics No 3*, Society of Exploration Geophysicists, 1987) in the frequency domain and in a source-free isotropic region, we see how the vertical field components are related to the horizontal field components:

$$E_z=(\partial_y H_x - \partial_x H_y)/(i\omega\varepsilon), \quad (2a)$$

$$\partial_z E_z=-(\partial_x E_x+\partial_y E_y), \quad (2b)$$

$$H_z=(\partial_x E_y-\partial_y E_x)/(i\omega\mu), \quad (2c)$$

$$\partial_z H_z=-(\partial_x H_x+\partial_y H_y). \quad (2d)$$

In an alternative notation, the $E_x$, $E_y$ and $E_z$ components can be specified as $E_1$, $E_2$ and $E_3$ and the $H_x$, $H_y$ and $H_z$ components can be specified as $H_1$, $H_2$ and $H_3$ in mutually orthogonal directions. Both notations are used interchangeably below.

The electromagnetic medium properties are described by three parameters: the electric permittivity $\varepsilon$, the electric conductivity $\sigma$, and the magnetic permeability $\mu$, where the permittivity and conductivity properties have been combined into the complex permittivity $\tilde{\varepsilon}=\varepsilon+i\sigma/\omega$. Equations 2b and 2d follow from Guass' law for the electric and magnetic field, respectively. Equation 2c follows from Faraday's law, and equation 2a follows from Ampere's law.

Estimating the Vertical Fields in a CSEM Survey

Figure 1:
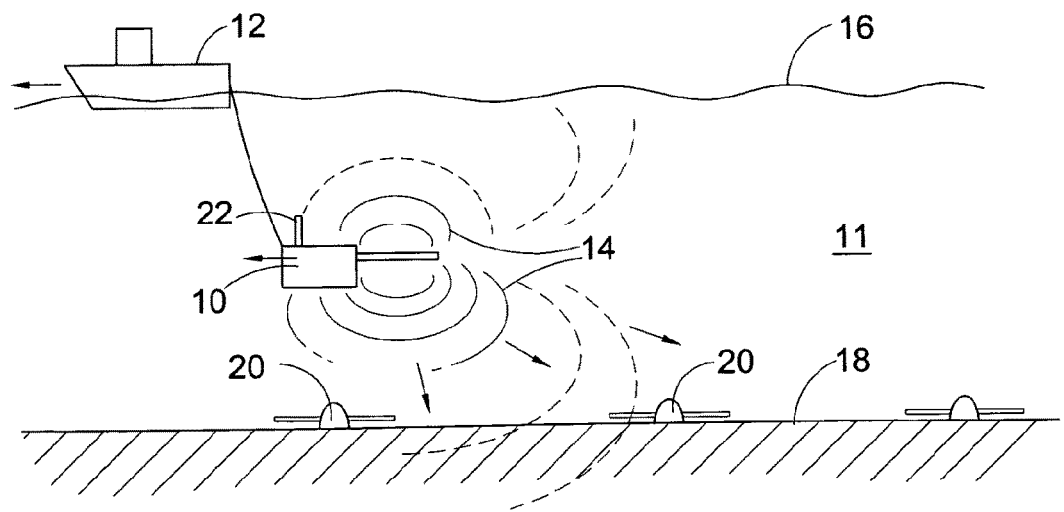
FIG. 1 is a drawing showing a CSEM survey.

In FIG. 1, a marine CSEM survey arrangement is shown in which a horizontal electric dipole source 10 is towed behind a vessel 12. The source is submerged in the water 11, typically a few meters above the seafloor, and transmits a low frequency electromagnetic field, as indicated by field lines 14. The field radiates and interacts with the seafloor 18. Seafloor receivers 20 are located on the seafloor 18 which detect the EM field response. The receivers 20 are arranged to measure horizontal electric and magnetic components of the field in two orthogonal directions. The measurements can be used to make inferences about sub-seafloor resistivity structure. In shallow water depths, high measured amplitudes can occur for certain components of the field due to interaction with air at the sea surface. This produces an "airwave" effect on the measured data. Water conductivity is measured at or near the source. The source or towfish may be provided with a conductivity meter 22 for measuring the water conductivity. The frequency of the dipole source 10 is set to a suitable value and monitored throughout the survey, for example 0.5 Hz. In other configurations, water conductivity may be measured at one or more receiver stations.

Figure 2:
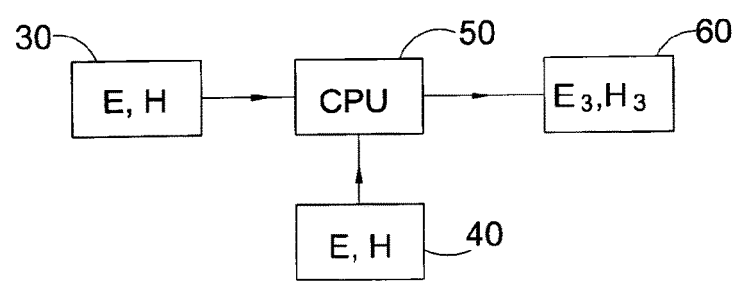
FIG. 2 is a schematic representation of a processing unit operative to perform an estimation of vertical components of the EM field.

The measured horizontal components are then used to estimate the vertical field components. This is illustrated in FIG. 2, in which the measured horizontal components in a first horizontal direction are represented by a first input 30 and the measured horizontal EM field components in a second horizontal direction are represented by a second input 40 to a processing unit 50 which operates to perform the estimation of vertical field component $E_3$, $H_3$, and/or their vertical derivatives, represented by output 60. The components of the first and second inputs 30,40 may be the orthogonal x and y components $E_2$, $H_2$ and $E_1$, $H_1$. They may not necessarily be the x and y components depending on the defined orientation of the coordinate system (but which may be orthogonal to each other), and if not, these horizontal components may then be processed and rotated appropriately to obtain processed orthogonal horizontal components that are the x and y components. This may be the case where it is difficult to determine the exact orientation of receivers on the seafloor. Typically, one of the x and y directions is defined along a towline for the source, which may facilitate analysing the results in terms of inline and broadside configurations and TM/TE components. In general, the horizontal components for all receivers may be rotated so that the measured components between different receiver stations is the same component of the field response i.e. the pair of processed orthogonal components at one station are the same components of the response as the processed orthogonal components of the next station (but of course generally of different magnitude at each). Estimating the vertical components of the field is generally carried out using a computer, and may typically form part of a larger processing sequence for the survey data. The theoretical relationship of horizontal field components and vertical components and their vertical derivatives is provided by Maxwell's equations in equation 2. In order to estimate the vertical components in the CSEM experiment, an approximation of these relations is made that involves taking differences/sums of the measured horizontal field components.

For this purpose, the CSEM survey is further configured as follows:

1. The receiver configuration is sufficiently large so that the resulting horizontal field differences are above the noise floor for the desired data offset intervals.
2. The differences are calculated in the time-domain and field quantities compared at the same locations in time.
3. The receiver layout, with receivers as either nodes or cables, may be as described in FIG. 3, or similar configurations that enable calculation of differences in both the towline and crossline directions.
4. The source is preferably towed at an angle to the towline or arranged to form an angle to the line joining the source and receivers, forming a "two-component" source, so that the source and receiver layout provide both the inline and broadside configurations, such as in FIG. 3. This enables both the calculation of $E_z$ data and $H_z$ data.

An advantage of calculating the $E_z$ and $H_z$ components in this manner is that we reduce the amount of correlated noise in the measured data since we utilize field components from nearby receivers. This proposed concept to extract both $E_z$ and $H_z$ furthermore requires that the (two-component) source is towed in a stable manner and that the receivers are accurately calibrated.

Collection of data using the inline and broadside configurations allows vertical components of the field to be estimated that may be expected to have strong TM or TE mode behaviour. Separating TM and TE modes helps data interpretation. The inline source-receiver configuration enables TM mode relations to be derived from the $E_z$ component and its vertical derivative since the $E_z$-component is non-zero and the $H_z$ component is close to zero for the inline source-receiver setup, in which the source points along the line between the source and receiver. Conversely, a broadside source-receiver configuration enables TE mode relations to be derived from the $H_z$ component and its vertical derivative since the $H_z$ component is non-zero and the $E_z$ component can be close to zero for the broadside source receiver setup where the source is pointing orthogonally to the line between the source and receiver.

One can also use common source points for calculating $E_z$ and $H_z$ data. In this case, correlated noise will not be removed and the receiver must be positioned off the towline in order to obtain the $dE_y/dy$ and $dH_x/dy$ components. This method can be useful if the receivers are not properly calibrated to each other.

The partial derivatives can be estimated from two receiver measurements with a certain separation distance. For simplicity we introduce the notation $$E_{n,m} = \frac{\partial E_n}{\partial x_m}, H_{n,m} = \frac{\partial H_n}{\partial x_m}, n, m = x, y, z. \tag{3}$$

When the sensors are located at horizontal positions, say $(x-\frac{1}{2}\Delta x, y)$, $(x+\frac{1}{2}\Delta x, y)$, $(x, y-\frac{1}{2}\Delta y)$ and $(x, y+\frac{1}{2}\Delta y)$, measuring the field, say $\varphi$, representing any of the electric or magnetic field components, the following difference formulas $$\frac{\partial \varphi(x, y)}{\partial x} \approx \frac{1}{\Delta x}\left[\varphi\left(x + \frac{1}{2}\Delta x, y\right) - \varphi\left(x - \frac{1}{2}\Delta x, y\right)\right], \quad (4a)$$

$$\frac{\partial \varphi(x, y)}{\partial y} \approx \frac{1}{\Delta y}\left[\varphi\left(x, y + \frac{1}{2}\Delta y\right) - \varphi\left(x, y - \frac{1}{2}\Delta y\right)\right], \quad (4b)$$

are examples of estimates that are used in place of the partial derivatives of equation 2. Thus, if we consider the Maxwell relation for the magnetic field, what should enter our estimate of the vertical electric field $E_3$ (to use the alternative notation), is approximations to the "sum" of partial derivatives of the horizontal components of the magnetic field, i.e. an approximation to $\partial_2 H_1 - \partial_1 H_2 / i\omega \varepsilon$.

The partial derivatives of the field are approximated by differences of the horizontal field components. The simplest approximation to estimate $E_3$ in position $(x_1, x_2)$ is to select three stations or receivers at which the horizontal field components are measured located at positions $(x_1, x_2), (x_1 + h_1, x_2)$ and $(x_1, x_2 + h_2)$ and then form the weighted sum $$E_3 \approx \frac{1}{i\omega \varepsilon h_2}[H_1(x_1, x_2 + h_2) - H_1(x_1, x_2)] - \frac{1}{i\omega \varepsilon h_1}[H_2(x_1 + h_1, x_2) - H_2(x_1, x_2)] \quad (10)$$

Similar procedures may be used to estimate the vertical field components and their vertical derivatives for the relations of Equations 2b to 2d. Practical approximations for the "sums" or differences of partial horizontal derivatives are made.

Preferably, at least three stations or receivers are deployed in a grid in the CSEM survey. Then the horizontal field measurements are combined to obtain an estimate of $E_3$ and $H_3$. The combination of horizontal field measurements involves weighted subtractions or "differences" of the measurements. Then, the weighted differences are further summed. The weights depend on the horizontal separation of the stations or receivers, but may also depend on frequency and medium parameters to account for the factors $i\omega\varepsilon$ and $i\omega\mu$. In the present example, the conductivity used in the weighting factor is the seawater conductivity, which may be measured during the survey using a conductivity meter. The frequency is the source frequency.

An alternative receiver arrangement using five receivers is shown in FIG. 4. The $x_1$-axis is along the sail line direction. The sensors are located at the positions $(x^-_1, x_2)$, $(x_1, x_2)$, $(x^+_1, x_2)$, $(x_1, x^-_2)$ and $(x_1, x^+_2)$. The distances between the sensors are denoted by $h_{1,2}^{\pm}/2 = |x_{1,2}^{\pm} - x_{1,2}|$. When the sensors are located at horizontal positions as suggested above, a weighted difference formula to estimate the vertical derivative of the vertical field components $\partial_3 E_3$ is $$-\partial_3 E_3 \approx \frac{E_1(x_1^+, x_2)}{h_1^+} - \frac{E_1(x_1^-, x_2)}{h_1^-} - \left(\frac{1}{h_1^+} - \frac{1}{h_1^-}\right) E_1(x_1, x_2) + \left[\frac{E_2(x_1, x_2^+)}{h_2^+} - \frac{E_2(x_1, x_2^-)}{h_2^-} - \left(\frac{1}{h_2^+} - \frac{1}{h_2^-}\right) E_2(x_1, x_2)\right]. \quad (11)$$

Likewise, $E_3$ can be "recorded" as $$-i\omega \varepsilon E_3 \approx \frac{H_1(x_1, x_2^+)}{h_2^+} - \frac{H_1(x_1, x_2^-)}{h_2^-} - \left(\frac{1}{h_2^+} - \frac{1}{h_2^-}\right) H_1(x_1, x_2) - \quad (12)$$

$$\left[\frac{H_2(x_1^+, x_2)}{h_1^+} - \frac{H_2(x_1^-, x_2)}{h_1^-} - \left(\frac{1}{h_1^+} - \frac{1}{h_1^-}\right) H_2(x_1, x_2)\right].$$

Further, $H_3$ can be recorded as $$-i\omega \mu H_3 \approx \frac{E_1(x_1, x_2^+)}{h_2^+} - \frac{E_1(x_1, x_2^-)}{h_2^-} - \left(\frac{1}{h_2^+} - \frac{1}{h_2^-}\right) E_1(x_1, x_2) - \quad (13)$$

$$\left[\frac{E_2(x_1^+, x_2)}{h_1^+} - \frac{E_2(x_1^-, x_2)}{h_1^-} - \left(\frac{1}{h_1^+} - \frac{1}{h_1^-}\right) E_2(x_1, x_2)\right].$$

We remark that with a typical CSEM survey setup, in order to reduce the noise level due to MT signals and uniform sea currents, the difference fields $E_{x,x}$ and $H_{y,y}$ can be utilized on its own in order to reduce correlated noise.

Effects of Difference Estimates on Airwave Signal

Consider the receiver layout in FIG. 5. Having the source pointing along the x-axis, the horizontal electromagnetic field components assuming a plane-layered model can be described as follows (Løseth, L. O., and Ursin, B., *Electromagnetic fields in planarly layered anisotropic media*, Geophysical Journal International, 170, 44-80, 2007):

$$E_x = -\frac{Il}{4\pi}\left[T_{A0}^{TM}\cos^2\beta + T_{A0}^{TE}\sin^2\beta + \frac{1}{\rho}(T_{A1}^{TE} - T_{A1}^{TM})\cos(2\beta)\right], \quad (5a)$$

$$E_y = -\frac{Il}{4\pi}\cos\beta\sin\beta\left[(T_{A0}^{TM} - T_{A0}^{TE}) + \frac{2}{\rho}(T_{A1}^{TE} - T_{A1}^{TM})\right], \quad (5b)$$

$$H_x = +\frac{Il}{4\pi}\cos\beta\sin\beta\left[(T_{D0}^{TM} - T_{D0}^{TE}) + \frac{2}{\rho}(T_{D1}^{TE} - T_{D1}^{TM})\right], \quad (5c)$$

$$H_y = -\frac{Il}{4\pi}\left[T_{D0}^{TM}\cos^2\beta + T_{D0}^{TE}\sin^2\beta + \frac{1}{\rho}(T_{D1}^{TE} - T_{D1}^{TM})\cos(2\beta)\right], \quad (5d)$$

Now, the expressions for the airwave assuming constant water conductivity $\sigma$ are:

$$T_{A0}^{a,TE} \sim \frac{2e^{ik(d_s+d_r)}}{\sigma\rho^3}\frac{1 + R_{sb}^s e^{2ikh_s}}{1 - R_{sb}^s e^{2ik(d_s+h_s)}}\frac{1 + R_{sb}^r e^{2ikh_r}}{1 - R_{sb}^r e^{2ik(d_r+h_r)}}, \quad (6a)$$

$$T_{D0}^{a,TE} \sim -\frac{2e^{ik(d_s+d_r)}}{ik\rho^3}\frac{1 + R_{sb}^s e^{2ikh_s}}{1 - R_{sb}^s e^{2ik(d_s+h_s)}}\frac{1 + R_{sb}^r e^{2ikh_r}}{1 - R_{sb}^r e^{2ik(d_r+h_r)}}, \quad (6b)$$

where $\rho$ is the horizontal offset, $d_s$ is the source depth below the sea surface, $h_s$ is the source height above the seabed, $d_r$ is the receiver depth, $h_r$ is the receiver height, and $$T_{A1}^{a,TE} \approx -\rho T_{A0}^{a,TE} \text{ and } T_{D1}^{a,TE} \approx -\rho T_{D0}^{a,TE} \quad (7)$$

Moreover, $R_{sb}^s$ and $R_{sb}^r$ are the subsurface reflection coefficients at the seabed for vertically travelling fields at the source and receiver locations, respectively. An approximation to the differences can then be written as:

$$\Delta E_x^{a,TE}(x, y) \approx T_{A1}^{a,TE}\left(\frac{-3x}{\rho^2}\right)\Delta x, \quad (8)$$

$$\Delta E_y^{a,TE}(x, y) \approx T_{A1}^{a,TE}\left(\frac{3x}{\rho^2}\right)\Delta y. \quad (9)$$

This shows that taking the difference in the x-direction changes the way the airwave appears in the data. Moreover, the expression for the difference of the $E_y$-component in the y-direction is opposite to the expression for the difference of the $E_x$-component in the x-direction. Thus, by taking the difference in the x-direction we remove correlated noise in the measurements such as MT-signals, and by combining the difference in the x- and y-directions, the "correlated airwave effect" can be removed.

In Gauss' law, equation 2b, the sum of the derivatives of $E_x$ in the x-direction and $E_y$ in the y-direction gives the vertical derivative of $E_z$, which TM/TE mode theory predicts would be a TM mode assuming a plane-layered earth. The airwave is a TE mode and can thus be removed by this way of combining the fields. In addition to removing correlated noise and the airwave, the present procedure for equation 2b removes the TE part of the signals that has propagated in the subsurface.

EXAMPLES

A CSEM survey experiment has been performed in the field using survey apparatus as shown in FIG. 1 including a receiver cluster and towline along which the source was towed, as depicted in FIG. 5. The receiver and towline configuration was determined using an expectation model to estimate how large the receiver separation would have to be in order to select the optimum distance between the receivers or stations for deriving good horizontal difference estimates of the recorded fields.

Since the survey did not include a two-component source, differences for approximating the $H_z$-component and its vertical derivative were not obtained, but from the applied inline source-receiver configuration, an estimate of the $E_z$ component and its vertical derivative was obtained by using horizontal differences of the horizontal magnetic and electric field components, respectively. Another aspect was to form only the differences in the towline direction. The difference field $E_x$ in the x-direction removes correlated noise due to MT-signals and uniform effects of possible sea currents. However it does not remove the effect of the airwave, although it changes how the airwave affects the data in line with equation 8. This can however be resolved by combining the difference of the x-directed field vector in the x-direction by the difference of the y-directed field vector in the y-direction.

In FIG. 6, the magnitude versus offset (MVO) and phase versus offset (PVO) is plotted for the calculated data using the synthetic model and the rotated measured total electric field components, $E_x$ and $E_y$. The synthetic model is a 1D model that was derived based on inversion. The x-difference of the electric field in the x-direction and the y-difference of the electric field in the y-direction is shown for receiver separation of 600 m in FIG. 7. The combination of the responses is shown in FIG. 8.

The other method for reducing correlated noise and extracting TM information in the data, uses the horizontal magnetic field components. The MVO plot for the magnetic field measured at receiver 1, cf. FIG. 5 is shown in FIG. 9. The difference fields in the x and y directions for the magnetic field in the y and x directions respectively, are shown in FIG. 10. The combined differences, shown in FIG. 11, scaled with sea water conductivity correspond to the vertical electric field. A plot of the calculated and measured vertical electric field is given in FIG. 12.

In addition to the shown differences for 600 m receiver spacing, we also calculated differences for available receiver spacing of 200 m and 400 m. The results indicated that the separation between receivers needed to overcome the noise floor is approximately 500 m with the data quality and dipole current moment that was used in this survey for this selected source frequency. An indication of what separation is needed is given by modelling the differences for different separation distances and checking the decrease in magnitude between zero offset and the required offset for interpreting data and comparing this to the known signal-to-noise ratio in previous CSEM measurements. An important point here is the amount of applied source current used at the desired frequency.

The derived $E_z$-field can also be compared to the derived $\partial_z E_z$-field. The process of deriving the $dE_z/dz$-field is shown in FIGS. 7 and 8, and the process of deriving the $E_z$-field is shown in FIGS. 10 to 12. The results indicate that calculating the $E_z$-component gives better results than calculating the $dE_z/dz$-component. However, since the electric data used for deriving the $dE_z/dz$ component are more accurately calibrated than the magnetic data used for calculating the $E_z$-component, both methods may add value to the interpretation.

There are several observations to be made in relation to the data. Using a rotation algorithm as described in Løseth, L. O., and Kritski, A., *New method for estimating receiver orientation in marine CSEM,* 2009, 71st EAGE conference, Amsterdam, the weighted difference estimate appears quite stable. By using the rotation procedure for several frequencies and different offset ranges, a systematic variation of approximately ±3° was obtained between the angle derived using the magnetic field and the angle derived using the electric field. On one of the receivers, the difference in rotation angle between the electric and magnetic field components was approximately 20°.

The magnetic field components were recalibrated by up to a factor of 1.3 to get good correspondence in magnitude between the estimates with 200 m, 400 m and 600 m receiver separation. Receiver calibration is therefore important, and the data suggest that this is also important for the electric field data. The results clearly show that the derived or estimated vertical field $E_z$ is better than the actual measured $E_z$ component as seen in FIG. 12.

In other cases, it may be important and desirable to measure and process the measured field components to account for possible non-orthogonality of receiver axes (between receivers) when deployed to measure x- and y-components directly. In other cases, the receivers may come to rest on the seafloor in such a way that the assumed horizontal field measurements are not actually truly horizontal. Thus, it may be desirable to measure and process the measured components of the response to account for orientation of the receiver or receiver station to take account of potential mis-alignment with the horizontal plane, i.e. the seabed.

For the $\partial_z E_z$-field, shown in FIG. 8, the largest separation distance (600 m) gives the best results. In theory, the difference fields for the three different separation distances available should be equal. We found, however, that the smallest separation distance 200 m gives quite noisy calculated data whereas the separation distance of 400 m gives results similar to the separation distance of 600 m. The optimal separation distance depends on the signal-to-noise ratio of the measurement and the applied source current for the applied frequencies.

In order to utilize the possibility to analyse $H_z$ data in the same manner as we have demonstrated for $E_z$ data, the CSEM experiment needs to include broadside data, i.e. one would require a two-component source. If this condition is met, the estimated vertical field data may be usable to analyse both the TE and TM modes. Moreover in this case one also has the possibility to remove the effect of any medium above the receivers, cf. Nordskag, J., Amundsen, L., Løseth, L. O., and Holvik, E., *Elimination of the water-layer response from multi-component source and receiver marine electromagnetic data, Geophysical Prospecting*, 57 (No 5), 897-918, 2008 which demonstrate the theoretical foundation for a "water-layer removal", and by using line data with a two-component dipole source to approximate a water-layer removal for line data. If the effects of the medium above the receivers are removed, a derivation of the TE and TM modes in the "remaining" part of the measured data can give a good indication of whether a CSEM response is due to a thin resistor or background effects.

We have shown that calculation of the vertical electric field gives better results than measuring it. Forming the differences of field components along the towline can in principle increase signal-to-noise ratio in the measurements. A further improvement is obtained by adding offline receivers in order to calculate the cross line field difference thus resulting in calculation of the vertical field. When this is done for the typical CSEM source (pointing in the towline direction) we are able to extract a good approximation to the TM field response.

It is beneficial to separate TM- and TE-mode responses for interpretation of CSEM data, and it is important to consider both modes or components concurrently. By applying a two-component source, i.e. a source that is towed at an angle to the towline, thus giving both a broadside and an inline configuration, one could extract both the TE- and TM-responses from the vertical field components that are potentially very valuable for further analysis of the CSEM data. The methodology requires accurate calibration of the CSEM receivers in order to image marginal anomalies in the subsurface.

The two-component source can be used to generate both the vertical electric field (source component pointing along the towline) and the vertical magnetic field (source component pointing along the towline), cf. FIG. 3. Now, instead of measuring the vertical components, we propose to estimate them. This gives more stable estimates of the components, and also has the potential to remove correlated noise if the receivers are properly calibrated. Another important point in this analysis is the ability to take over the airwave in the field components. In a layered medium, the vertical electric field has no airwave component, but the subsurface TE response in the vertical magnetic component is masked by the airwave component. This must be properly accounted for in order to be able to study the subsurface response.

A particular benefit of applying a two-component source towed along, say the x-direction and removing the airwave from the data, is that the remaining horizontal electric and magnetic field due to the inline source component ($E_x$ and $H_z$ respectively) is mainly TM polarized whereas the horizontal electric and magnetic field due to the broadside source component ($E_y$ and $H_z$ respectively) is mainly TE polarized. The horizontal components can thus be used in order to separate between thin resistive layer responses and varying background responses as an additional or alternative method to analysing the calculated or estimated vertical field components.

Various modifications and improvements may be made within the scope of the invention herein described.

The invention claimed is:

1. A method of performing a controlled source electromagnetic (CSEM) survey and/or processing CSEM survey data, the method comprising the steps of:

a) providing first and second horizontal components of an electromagnetic field response detected by at least two receivers deployed at first and second geographical locations spaced apart by a distance in a range of 100 m to 1000 m in a CSEM survey in which an electromagnetic field is transmitted by an electric dipole source; and b) estimating a vertical component of the electromagnetic field response by combining the detected first and second horizontal components of the electromagnetic field response, wherein the step b) comprises using first and second weighting factors and the detected horizontal field components to estimate the vertical component, and wherein said first weighting factor depends on a horizontal separation of the at least two receivers when detecting said first horizontal component of said electromagnetic field response; and said second weighting factor depends on a horizontal separation of the at least two receivers when detecting said second horizontal component of said electromagnetic field response.

2. A method as claimed in claim 1, wherein step d comprises estimating a weighted difference or sum based on the detected first and second horizontal field components.

3. A method as claimed in claim 1, wherein step d includes approximating a horizontal derivative of the electromagnetic field response.

4. A method as claimed in claim 1, including the steps of: deploying at least one receiver in said first geographical location and at least one receiver in said second geographical location; detecting two horizontal components of the electromagnetic field response using the at least one receiver in the first geographical location to form thereby a first set of horizontal components for the first geographical location; detecting two horizontal components of the electromagnetic field response using the at least one receiver in the second geographical location to form thereby a second set of field components for the second location; and estimating the at least one vertical field component by forming a weighted sum or difference using the first and second sets of detected first and second horizontal field components from the first and second geographical locations.

5. A method as claimed in claim 4, wherein the two detected horizontal components in each of the first and second sets are orthogonal components.

6. A method as claimed in claim 4, including the steps of: processing the detected first set of horizontal components of the field to form at least one first processed horizontal component of the field response for the first geographical location in a direction defined along a pre-determined axis; processing the detected second set of horizontal components of the field to form at least one second processed horizontal field component for the second geographical location in a direction defined along the same pre-determined axis; and forming the weighted sum or difference by forming a sum or difference between of the at least one first and second processed horizontal field components derived for the first and second geographical locations.

7. A method as claimed in any claim 4, wherein the at least one first processed field horizontal component of the field response comprises two first processed horizontal components which are orthogonal; and the at least one second processed component of the field response comprises two second processed horizontal components which are orthogonal, wherein the first and second processed horizontal components for the first and second geographical locations provide corresponding components of the field response.

8. A method as claimed in claim 4, wherein the first and second geographical locations are spaced apart by a distance of between around 200 to 1000 m.

9. A method as claimed in claim 1, wherein the method includes deploying at least one receiver in at least three different geographical locations wherein the first and second locations are on a line extending at least between said first and second locations and the third geographical location is located off said line; detecting at least two horizontal orthogonal components of the electromagnetic field response using the at least one receiver to thereby form a set of orthogonal components at each location; processing the detected set of components for each location to derive at least one processed set of orthogonal horizontal components for each location, such that the processed sets of orthogonal horizontal components comprise corresponding components of the electromagnetic field response for each location; and estimating vertical magnetic and vertical electric components of the electromagnetic field response includes differencing or summing the processed horizontal components from different geographical locations defined along the same axis direction.

10. A method as claimed in claim 1, wherein the estimated vertical component of the electromagnetic field is selected from the group consisting of: a vertical electric ($E_z$) component; a vertical magnetic ($H_z$) component; a vertical derivative of the vertical electric field component; and a vertical derivative of the vertical magnetic field component.

11. A method as claimed in claim 1, wherein the electric dipole source is a vertical or horizontal electric dipole source.

12. A method as claimed in claim 1, deploying at least one receiver includes deploying first and second receivers to form a first receiver pair on a first receiver line extending at least between the first and second receivers, and deploying third and fourth receivers to form a second receiver pair on a second receiver line extending at least between the third and fourth receivers, and arranging the first and second receiver pairs so that the first and second receiver lines intersect.

13. A method as claimed in claim 12, including the step of deploying at least the first or second receiver and the third or fourth receiver in a common receiver unit at a first deployment locality.

14. A method as claimed in claim 12, including the step of arranging the first and second receiver pairs so that the first and second receiver lines are arranged orthogonally.

15. A method as claimed in claim 12, including the step of detecting a first horizontal component of the electromagnetic field response in a direction defined along the first receiver line and detecting a second horizontal component of the electromagnetic field response in a direction defined along the second receiver line.

16. A method as claimed in claim 1, wherein the source is a horizontal dipole source, the source defining a dipole axis, and the method includes the step of arranging the horizontal electric dipole source to form an acute angle between the dipole axis and a line extending between the source and the at least one receiver.

17. A method as claimed in claim 1, further comprising:
a. deploying the at least two receivers and an electric dipole source;
b. transmitting an electromagnetic field from the electric dipole source; and
c. detecting the first horizontal component and the second horizontal component of an electromagnetic field response to the transmitted electric field using the at least two receivers.

18. A method as claimed in claim 17, wherein the method includes determining the weighting factor in dependence on at least one property of the medium through which the transmitted electromagnetic field propagates.

19. A method as claimed in claim 18, wherein the at least one property of the medium includes seawater conductivity.

20. A method as claimed in claim 19, including the step of measuring the seawater conductivity.

21. A method as claimed in claim 1, further comprising the step of detecting presence of a subsurface hydrocarbon-saturated reservoir according to the estimated vertical component of the electromagnetic field response.

22. Apparatus for performing a controlled source electromagnetic survey, comprising:
an electric dipole source having a dipole axis and arranged to transmit an electromagnetic field;
at least two receivers adapted to detect a first horizontal component and a second horizontal component of an electromagnetic field response; and
a processing unit operative to estimate a vertical component of the electromagnetic field response using the detected first and second horizontal components of the response and first and second weighting factors,
wherein said first weighting factor depends on a horizontal separation of the at least two receivers when detecting said first horizontal component of said electromagnetic field response;
and said second weighting factor depends on a horizontal separation of the at least two receivers when detecting said second horizontal component of said electromagnetic field response, and
wherein the at least two receivers are deployed at first and second geographical locations spaced apart by a distance in a range of 100 m to 1000 m to increase the signal-to-noise ratio above a threshold.

23. A non-transitory computer-readable storage medium having computer-executable program code instructions stored therein, the computer-executable program code instructions comprising program code instructions for processing controlled source electromagnetic data, the data comprising first and second horizontal components of an electromagnetic field response detected by two receivers deployed at first and second geographical locations spaced apart by a distance in a range of 100 m to 1000 m in a controlled source electromagnetic survey in which an electromagnetic field is transmitted by an electric dipole source, whereby the data are read in and processed to estimate a vertical component of the electromagnetic field response from the first and second horizontal components of the response and first and second weighting factors,
wherein said first weighting factor depends on a horizontal separation of the at least two receivers when detecting said first horizontal component of said electromagnetic field response; and said second weighting factor depends on a horizontal separation of the at least two receivers when detecting said second horizontal component of said electromagnetic field response.

24. A computer loaded with machine-readable instructions for the computer to perform processing of controlled source electromagnetic data, the data comprising first and second horizontal components of an electromagnetic field response detected by two receivers deployed at first and second geographical locations spaced apart by a distance in a range of 100 m to 1000 m in a controlled source electromagnetic survey in which an electromagnetic field is transmitted by an electric dipole source, whereby data are read in and processed by the computer according to the instructions to estimate a vertical component of the electromagnetic field response from the first and second horizontal components of the response and first and second weighting factors, wherein said first weighting factor depends on a horizontal separation of the at least two receivers when detecting said first horizontal component of said electromagnetic field response; and said second weighting factor depends on a horizontal separation of the at least two receivers when detecting said second horizontal component of said electromagnetic field response.

\* \* \* \* \*